(12) United States Patent
Iwabuchi

(10) Patent No.: US 10,532,614 B2
(45) Date of Patent: Jan. 14, 2020

(54) TIRE

(71) Applicant: BRIDGESTONE CORPORATION, Tokyo (JP)

(72) Inventor: Sotaro Iwabuchi, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 374 days.

(21) Appl. No.: 15/122,232

(22) PCT Filed: Feb. 13, 2015

(86) PCT No.: PCT/JP2015/053903
§ 371 (c)(1),
(2) Date: Aug. 29, 2016

(87) PCT Pub. No.: WO2015/133245
PCT Pub. Date: Sep. 11, 2015

(65) Prior Publication Data
US 2016/0361955 A1    Dec. 15, 2016

(30) Foreign Application Priority Data
Mar. 5, 2014   (JP) ................... 2014-042693

(51) Int. Cl.
*B60C 13/00*   (2006.01)
*B60C 13/02*   (2006.01)

(52) U.S. Cl.
CPC .......... *B60C 13/001* (2013.01); *B60C 13/00* (2013.01); *B60C 13/02* (2013.01)

(58) Field of Classification Search
CPC ...... B60C 13/001; B60C 13/002; B60C 13/02
See application file for complete search history.

(56) References Cited

U.S. PATENT DOCUMENTS 4,343,342 A * 8/1982 McDonald ............ B60C 13/001
152/523
5,645,660 A 7/1997 Attinello et al.
(Continued)

FOREIGN PATENT DOCUMENTS

CN    101448657 A    6/2009
DE    801071 C    12/1950
(Continued)

OTHER PUBLICATIONS

Communication dated Mar. 22, 2017 issued by the State Intellectual Property Office of People's Republic of China in counterpart Application No. 201580011544.0.
(Continued)

*Primary Examiner* — Kendra Ly
(74) *Attorney, Agent, or Firm* — Sughrue Mion, PLLC

(57) ABSTRACT

Provided is a tire in which, by improving a decorative portion provided on a side portion, while a high visibility and a crack resistance are secured, molding man-hours are reduced, thereby improving a moldability and a cost performance. The a tire comprises, on a sidewall portion: a decorative band 11 formed of a protruding strip 21; and an inside outer edge protruding portion 22 and an outside outer edge protruding portion 23 which are arranged adjacent inside and outside the decorative band in the radial direction respectively, and which are more protruded toward the tire outer surface side than the protruding strip, the decorative band is formed by arranging a plurality of decorative elements 24 formed by the protruding strip continuously extending from the inside outer edge protruding portion to the outside outer edge protruding portion without interruption in the tire circumferential direction, the decorative elements adjacent to each other in the tire circumferential direction are divided by a valley portion 25 which is formed between the protruding strips and extends in the tire radial (Continued)

direction, and at least a portion of the decorative element comprises a first region 24A in which the protruding strip is densely arranged partially in a zigzag shape and a second region 24B in which the protruding strip is loosely arranged, and the decorative element does not comprise an intersection at which the protruding strips from three or more different directions are crossed.

8 Claims, 6 Drawing Sheets

(56) References Cited

U.S. PATENT DOCUMENTS

| | | |
|---|---|---|
| 2010/0000648 A1 | 1/2010 | Nakano |
| 2010/0300594 A1 | 12/2010 | Mukai |
| 2011/0139326 A1* | 6/2011 | Nukushina ......... B29D 30/0606 152/523 |
| 2012/0055603 A1 | 3/2012 | Tokizaki |
| 2012/0273101 A1 | 11/2012 | Iwabuchi et al. |

FOREIGN PATENT DOCUMENTS

| | | |
|---|---|---|
| EP | 0751014 A3 | 1/1997 |
| JP | 6106921 A | 4/1994 |
| JP | 11-291722 A | 10/1999 |
| JP | 2010-274740 A | 12/2010 |
| JP | 2011-121523 A | 6/2011 |
| JP | 2011-148338 A | 8/2011 |
| JP | 2012188037 A | 10/2012 |

OTHER PUBLICATIONS

Communication dated Feb. 28, 2017, from the European Patent Office in counterpart European Application No. 15758241.2.
International Search Report of PCT/JP2015/053903 dated Apr. 14, 2015 [PCT/ISA/210].
Written Opinion of PCT/JP2015/053903 dated Apr. 14, 2015 [PCT/ISA/237].

\* cited by examiner

TIRE

TECHNICAL FIELD

The present invention relates to a tire, and more particularly to an improvement of a tire comprising a decorative portion on a tire side portion.

BACKGROUND ART

Conventionally, a side portion of a tire is provided with a decorative band formed by arranging a plurality of straight line-shaped or curved line-shaped protruding strips (ridges). For example, Patent Document 1 discloses a tire provided with a decorative portion on a tire side portion, wherein the decorative portion comprises: a decorative element including a ridge; and a valley which is inclined with respect to the tire circumferential direction and which makes the ridge discontinuous in the tire circumferential direction by separating a decorative element into two or more regions, wherein the ridge comprises: a first ridge; and a second ridge at least one of the height and the width of which is smaller than those of the first ridge, and at least a portion of the first ridge is adjacent to each other while inclined to the tire circumferential direction, thereby forming a valley between adjacent first ridges. Such a ridge can be formed during vulcanization molding by forming in advance a recess on an inner wall surface of a mold (die) for vulcanization molding of a green tire.

RELATED ART DOCUMENT

Patent Document

Patent Document 1: Japanese Unexamined Patent Application Publication No. 2011-148338

SUMMARY OF THE INVENTION

Problems to be Solved by the Invention

According to a technique disclosed in Patent Document 1, a tire comprising on a side portion a decorative portion having a highly visible design and having an excellent crack resistance is provided. In this case, however, since the decorative portion comprises two types of ridges having different height or width, and the ridge as a whole has a complex arrangement, many man-hours for vulcanization molding of a tire are required, likely leading to an increase in cost, which is a drawback.

Accordingly, an object of the present invention is to provide a tire in which, by improving a decorative portion provided on a side portion, while a high visibility and a crack resistance are secured, molding man-hours are reduced, thereby improving a moldability and a cost performance.

Means for Solving the Problems

The present inventor intensively studied to find that the above-described problems can be solved by employing the configuration below, thereby completing the present invention.

Specifically, a tire of the present invention is a tire comprising on a sidewall portion: a decorative band formed of a protruding strip; and an inside outer edge protruding portion and an outside outer edge protruding portion which are arranged adjacent inside and outside the decorative band in the tire radial direction respectively, and which are more protruded toward the tire outer surface side than the protruding strip, the decorative band is formed by arranging a plurality of decorative elements formed by the protruding strip continuously extending from the inside outer edge protruding portion to the outside outer edge protruding portion without interruption in the tire circumferential direction, the decorative elements adjacent to each other in the tire circumferential direction are divided by a valley portion which is formed between the protruding strips and extends in the tire radial direction, and at least a portion of the decorative element comprises a first region in which the protruding strip is densely arranged partially in a zigzag shape and a second region in which the protruding strip is loosely arranged, and the decorative element does not comprise an intersection at which the protruding strips from three or more different directions are crossed.

In the tire of the present invention, the first region and the second region preferably have the same contour shape, when viewed from the tire outer surface side. In the tire of the present invention, preferably, the first region includes, in the whole decorative band, the protruding strips having different extending directions, and more preferably, extending directions of the protruding strips in the first region differ between the first regions adjacent to the tire radial direction or the tire circumferential direction.

Further, in the tire of the present invention, the decorative element preferably extends in a direction inclined with respect to the tire radial direction. Still further, the tire of the present invention preferably comprises, on both sides of the decorative band in the tire circumferential direction, a two-sided outer edge protruding portion which has the same height as those of the inside outer edge protruding portion and the outside outer edge protruding portion and which extends in the tire radial direction. Still further, in the tire of the present invention, preferably, the decorative element comprises a plurality of the first regions and a plurality of the second regions in the tire radial direction, and the width of each region in the tire circumferential direction is not larger than 20 mm.

Effects of the Invention

The present invention can realize a technique in a tire provided with a decorative portion on a side portion, in which, while a high visibility and a crack resistance in the decorative portion are secured, molding man-hours are reduced, thereby improving a moldability and a cost performance.

MODE FOR CARRYING OUT THE INVENTION

In the following, embodiments of the present invention will be described in detail with reference to the drawings.

First Embodiment

Figure 1:
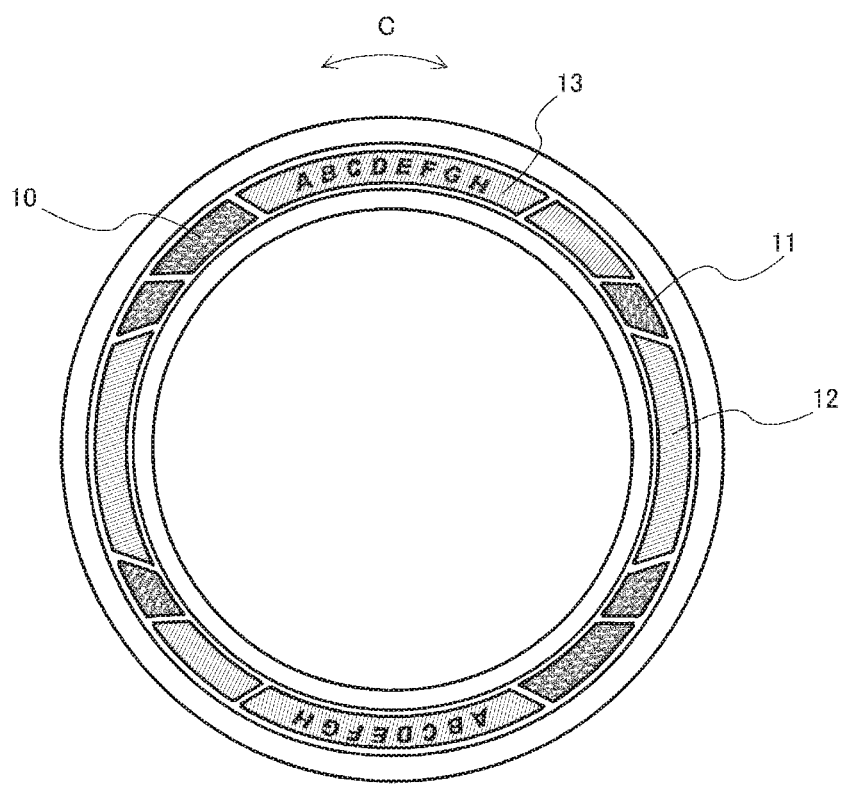
FIG. 1 is a side view illustrating one configuration example of a tire of the present invention.
Figure 2:
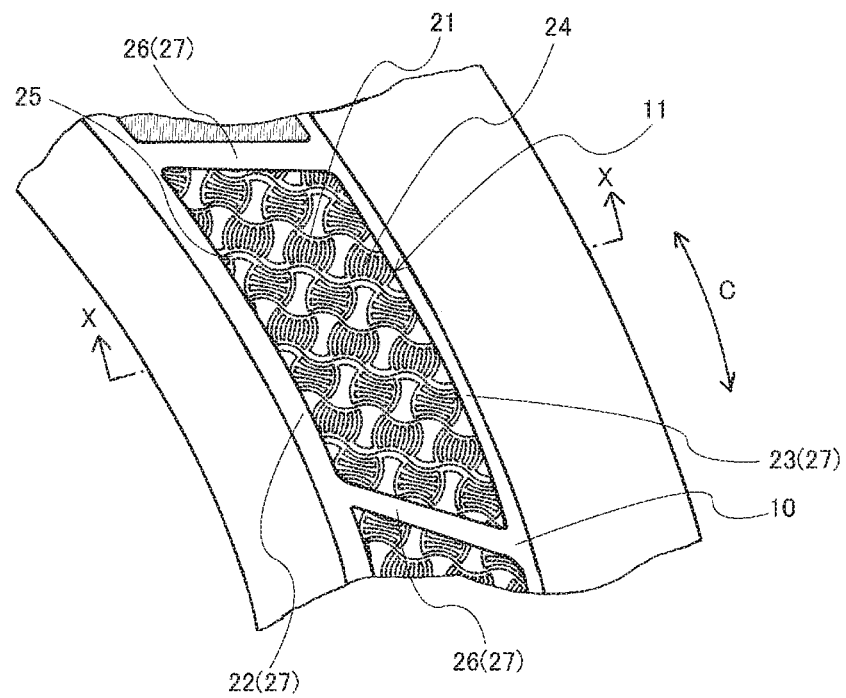
FIG. 2 is a partially enlarged view illustrating a decorative band according to a first embodiment of the present invention.
Figure 3:
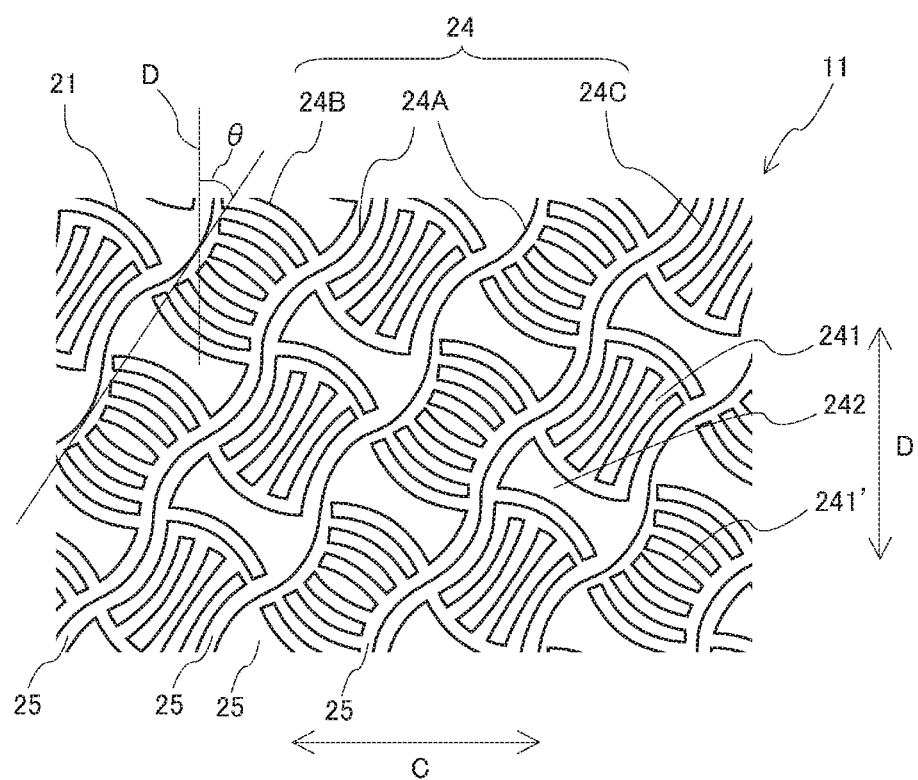
FIG. 3 is a partially enlarged view illustrating a part taken out from the decorative band illustrated in FIG. 2.

FIG. 1 is a side view illustrating one configuration example of a tire of the present invention. The illustrated tire comprises on a sidewall portion 10 a plurality of decorative portions 11, 12, and 13. FIG. 2 is a partially enlarged view illustrating a decorative band according to a first embodiment of the present invention, and FIG. 3 is a partially enlarged view illustrating a part taken out from the decorative band illustrated in FIG. 2. In the drawings, an arrow sign C designates a tire circumferential direction, and an arrow sign D designates a tire radial direction.

The tire of the present invention is characterized by comprising the decorative band 11 as a decorative portion having high designability and excellent visibility. As illustrated in FIG. 2, the decorative band 11 is formed of a protruding strip 21, and is defined by an inside outer edge protruding portion 22 and an outside outer edge protruding portion 23 which are arranged adjacent thereto inside and outside in the tire radial direction, respectively.

The decorative band 11 is constituted by arranging in the tire circumferential direction a plurality of decorative elements 24 formed of the protruding strip 21 continuously extending from the inside outer edge protruding portion 22 to the outside outer edge protruding portion 23 without interruption, and the decorative elements 24 adjacent to each other in the tire circumferential direction are formed between the protruding strips 21 and are divided by a valley portion 25 extending in the tire radial direction. As described above, since, by providing the valley portion 25 between the plurality of arranged decorative elements 24 in the tire circumferential direction, continuous arrangement of the protruding strip 21 in the tire circumferential direction can be prevented, an effect of inhibiting occurrence and development of a crack in the tire circumferential direction can be obtained. Since the valley portion 25 which divides the decorative elements 24 is substantially formed by a pair of protruding strips 21 each constituting the adjacent decorative element 24, it is not necessary to provide, on the decorative band 11, a portion whose height in the tire radial direction is lower than that of a portion where the protruding strip 21 is not provided, thereby securing sufficiently high strength of the valley portion 25.

Figure 4:
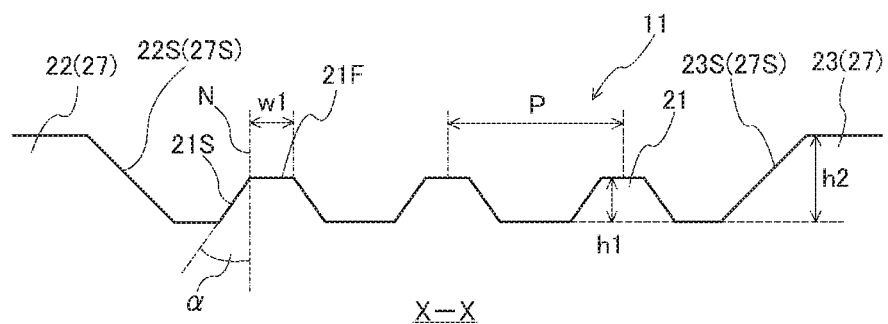
FIG. 4 is an explanatory drawing schematically illustrating cross-sectional shapes of a decorative band, an inside outer edge protruding portion, and an outside outer edge protruding portion along an X-X line in FIG. 2.

FIG. 4 illustrates an explanatory drawing schematically illustrating cross-sectional shapes of the decorative band 11, the inside outer edge protruding portion 22, and the outside outer edge protruding portion 23 along the X-X line in FIG. 2. As illustrated, the inside outer edge protruding portion 22 and the outside outer edge protruding portion 23 are higher than the protruding strip 21 forming the decorative band 11, and in other words, they are formed to be more protruded toward the tire outer surface side than the protruding strip 21. As illustrated in FIGS. 2 and 3, the decorative element 24 does not comprise an intersection at which the protruding strips 21 from three or more different directions are crossed, and in other words, the decorative element 24 has a unicursal shape from the inside to the outside in the tire radial direction.

From the viewpoint of moldability, most preferably, whole the decorative band can be processed in a unicursal manner, thereby obtaining favorable easy processing. On the other hand, however, considering that whole the decorative band is a unicursal shape, a protruding strip continuing in the tire circumferential direction is partly formed at both ends of the decorative band in the tire radial direction, thereby deteriorating uniformity of the decorative portion and causing disfigurement. Since forming protruding strips continuing in the tire circumferential direction at both ends of the decorative band in the tire radial direction means presence of protruding strips substantially at the same position in the tire radial direction although intermittently, a crack is likely to develop in the tire circumferential direction at such a portion. Accordingly, in the present invention, the inside outer edge protruding portion 22 and the outside outer edge protruding portion 23 are arranged adjacent inside and outside the decorative band 11 in the tire radial direction, and in other words, a mold has a shape in which the inside and the outside of the decorative band 11 in the tire radial direction are more deeply curved. By this, both ends of the decorative band 11 in the tire radial direction are not exhibited in the tire even when whole the decorative band 11 is made into a unicursal shape, and therefore, uniformity of the decorative portion is not compromised, and a problem of deterioration of a crack resistance at these portions can be prevented. By providing the outside outer edge protruding portion 23, an effect of inhibiting occurrence of a break or the like of the decorative element 24 due to tire rubbing or the like can also be obtained, and the resistance of the decorative band 11 can be improved.

Even when the protruding strips 21 from three or more different directions are crossed, a unicursal shape is possible; however, when there is an intersection at which the protruding strips 21 from three or more different directions are cross, there occurs such a problem that a burr is likely to be generated at the intersection when a mold is processed. Accordingly, when the protruding strips 21 only from at most two directions are crossed, the appearance of the decorative band 11 can be secured, and ease of processing can be more improved while occurrence of a starting point of a crack or the like is prevented. Examples of a processing tool used for processing of a mold include a molding cutter or a drill.

Here, as illustrated in FIG. 2, preferably, in the present invention, also on both sides of the decorative band 11 in the tire circumferential direction, two-sided outer edge protruding portions 26 whose heights are the same as those of the inside outer edge protruding portion 22 and the outside outer edge protruding portion 23 and which extend in the tire radial direction are provided. By this, when the whole decorative band 11 is made into a unicursal shape, both ends of the decorative band 11 in the tire circumferential direction can also be not exhibited in the tire, thereby improving uniformity of the decorative portion. Due to the two-sided outer edge protruding portion 26, the decorative band 11 is separated from other regions in the tire circumferential direction, and therefore, an effect of inhibiting flexural deformation caused by bending of the tire can be enhanced, and in addition, connection of cracks in the tire circumferential direction can be effectively inhibited.

Figure 5:
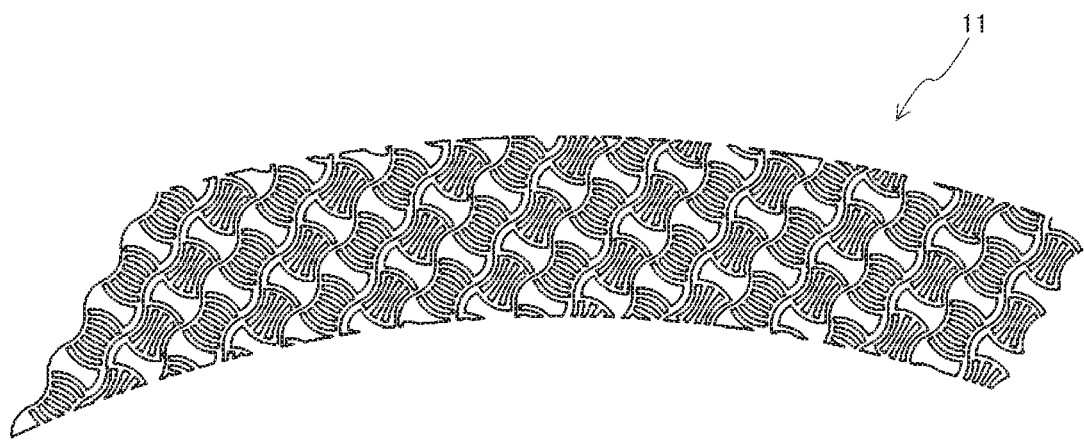
FIG. 5 is an explanatory drawing illustrating a whole pattern of the decorative band according to the first embodiment.

In the present embodiment, the decorative band 11 can be made into a unicursal shape as illustrated in FIG. 5. Since the inside outer edge protruding portion 22, the outside outer edge protruding portion 23, and the two-sided outer edge protruding portion 26 are provided, portions on both sides of the decorative band 11 in the tire radial direction and both sides of the decorative band 11 in the tire circumferential direction are not reflected on a mold, and therefore, they are not exhibited in the tire. In this case, a recessed groove on the surface of a mold corresponding to the protruding strip 21 forming the decorative band 11 on the surface of the tire can be unicursally formed by one type of processing tool, and therefore, all the formed protruding strips 21 have the same cross-sectional shape (height and width). Here, the cross-sectional shape of the protruding strip 21 means a cross section in a direction perpendicular to an extending direction of the protruding strip 21. For example, in a technique described in Patent Document 1, two types of ridges at least one of each of which height and width is different are used, and therefore, two types of processing tools having different shapes are required, resulting in increased number of man-hours. On the other hand, in the present invention, unicursal processing reduces the number of man-hours, and an effect of reducing processing cost can also be obtained.

As illustrated in FIG. 3, in the present invention, at least a part of the decorative element 24 comprises a first region 241 in which the protruding strip 21 is densely arranged partially in a zigzag shape and a second region 242 in which the protruding strip 21 is loosely arranged. By this, visibility of the decorative band 11 can also be favorably secured.

Specifically, the decorative element 24 of the present embodiment comprises a wave-shaped element 24A composed of the wave-shaped protruding strip 21 extending from the lower-left side of the paper to the upper-right side of the paper, or extending in a direction inclined with respect to the tire circumferential direction C from the inside to the outside in the tire radial direction viewed from the tire side surface, and zigzag-shaped elements 24B and 24C comprising the first region 241 in which the protruding strip 21 is densely arranged partially in a zigzag shape and the second region 242 in which the protruding strip 21 is loosely arranged. In the illustrated example, in the zigzag-shaped elements 24B and 24C, the first region 241 and the second region 242 are alternately provided, and as the whole decorative band 11, the first region 241 and the second region 242 are each set to be arranged in a zigzag shape by arranging each decorative element such that the first region 241 and the second region 242 are alternately arrayed both in one zigzag-shaped element and between zigzag-shaped elements adjacent to each other in the tire circumferential direction. The valley portion 25 is provided between decorative elements 24A, 24B, and 24C. In this case, since the valley portion 25 is continuously provided in the tire radial direction between the decorative elements 24 each formed by the protruding strip 21 continuously extending from the inside outer edge protruding portion 22 to the outside outer edge protruding portion 23 without interruption, the appearance of the tire is favorable compared with cases in which a valley portion is not continued. Even when the valley portion 25 is continuously formed, a crack at the bottom of the valley can be not likely to be generated by setting the width of the bottom of the valley portion 25, for example, to 0.2 mm or larger.

Here, in the present invention, the first region 241 and the second region 242 mean a portion in which the protruding strip 21 is relatively densely arranged and a portion in which the protruding strip 21 is relatively loosely arranged in the decorative element 24, and a specific interval between the protruding strips 21 in each region is not particularly restricted. As illustrated, in the second region 242, since the protruding strip 21 is loosely arrayed, although the second region 242 substantially includes a smooth surface not including the protruding strip 21, the second region 242 comprising such a smooth surface has an effect that the visibility of the region is not likely to be deteriorated even dirt such as soil is attached thereto. The smooth surface has a high reflectance of a light and has a uniform reflection angle, contributing to improvement of the visibility. On the other hand, since the protruding strip 21 is densely arranged in the first region 241, a silhouette is effectively formed when a light strikes thereon, which can improve the visibility.

The illustrated decorative element 24 comprises a plurality of the first regions 241 and a plurality of the second regions 242 in the tire radial direction, and the size of each region may be appropriately selected depending on the size of an applied tire or the size of a decorative band, or the like, and not particularly restricted. From the viewpoint of inhibiting connection of cracks in the tire circumferential direction, the width of each region in the tire circumferential direction is preferably not larger than 20 mm. Here, the width of each region in the tire circumferential direction refers to the maximum width of each region measured in a direction perpendicular to the tire radial direction.

In the present embodiment, the first region 241 and the second region 242 have the same contour shape when viewed from the tire outer surface side. For this reason, the uniformity of the whole decorative band 11 is improved.

Further, in the present embodiment, the whole decorative band 11 includes first regions 241 and 241' in which extending directions of the protruding strips 21 are different. Here, the extending direction of the protruding strip 21 in the first region means the extending direction of the protruding strip 21 which passes the center portion of each first region among the protruding strips 21 constituting each first region. As described above, since visibility is obtained by lights from different incident directions by providing two types of first regions having different extending directions of the protruding strips 21, the visibility of the decorative band 11 can be more improved. In this case, the extending directions of the protruding strips 21 are preferably different between the first regions 241 and 241' adjacent to the tire radial direction or the tire circumferential direction from the viewpoint of securely obtaining visibility by lights from any incident directions. The extending directions of the protruding strips 21 may be different in any angle between first regions 241 and 241' having different extending directions of the protruding strips 21, and for example, in the illustrated example, the extending directions of the protruding strips 21 are different from each other substantially by 90° between the first regions 241 and 241'. By this, the reflection directions of lights on the first region 241 and the first region 241' are different from each other by about 90°, and the shading of a shadow changes regularly depending on the direction in which the region is seen, thereby further improving the appearance (designability) of the tire side surface. The first regions having different extending directions of the protruding strip 21 are not limited to the case of two types of first regions, and three or more types of first regions may be provided.

In the present embodiment, the first region 241 in the decorative element 24 is composed only of a portion in which the protruding strip 21 extends in a curved line, and does not substantially comprise a portion in which the protruding strip 21 extends in a straight line. This is because, since the whole decorative band 11 is unicursally formed, it is necessary to make the arrangement of the protruding strip 21 in a curved line-shaped in order to always make a distance between the densely arranged protruding strips 21 a constant interval or larger.

Still further, in the present embodiment, the decorative element 24 extends in a direction inclined with respect to the tire radial direction D. When the decorative element 24 extends completely in the tire radial direction D, although a problem is not caused during normal traveling or the like, there is a concern that a crack occurs when a fore-and-aft input force is applied. In contrast, provision of the decorative element 24 in a direction inclined with respect to the tire radial direction D can make it likely not to generate a crack against a variety of inputs. Here, the extending direction of the decorative element 24 is a direction of a tangent drawn in the longitudinal direction of each decorative element 24. The angle θ formed by the extending direction of the decorative element 24 with respect to the tire radial direction D can be, for example, in the range of 10° to 60°.

Although, in an example illustrated in FIG. 1, the decorative portion is composed of the above-described decorative band 11, second decorative band 12, and mark portion 13, the present invention is not limited to such a configuration. Among these, on the second decorative band 12, a large number of protruding strips each having a curved line shape protruded outside in the tire radial direction, and each, for example, inclined with respect to the tire radial direction by an angle of around 45° are arrayed in parallel to each other. On the mark portion 13, a character, a diagram, a sign, and the like in accordance with the type of a tire or the like are displayed in a convex manner. A portion of the mark portion 13 other than the portion on which a character, a diagram, a sign, and the like are displayed in a convex manner may be formed in a smooth surface, or may be provided with a curved line-shaped protruding strip similar to that of the second decorative band 12.

In the illustrated example, on the sidewall portion 10, a land portion 27 substantially continuing over the tire circumferential direction is provided, and the inside outer edge protruding portion 22, the outside outer edge protruding portion 23, and the two-sided outer edge protruding portion 26 constitute a part of the land portion 27. The decorative portions 11, 12, and 13 are all provided as recessed portions in the land portion 27, and all protruding strips constituting the decorative portions 11, 12, and 13 are formed with heights lower than that of the land portion 27. As the result, the decorative portions 11, 12, and 13 are surrounded by the land portion 27, thereby inhibiting a damage of not only the decorative portion 11 but also the decorative portions 12 and 13. A character or the like displayed on the decorative portion 13 is formed such that the height thereof is higher than that of the protruding strip in order to obtain a higher visibility, and for example, formed such that the height is the same as that of the land portion 27 or higher than that of the land portion 27. Further, regarding a character or the like, a portion whose height is large may be provided so as to rim the character or the like by making the edge higher than the other portion.

As illustrated in FIG. 4, the protruding strip 21 has a trapezoidal cross section, and the width w1 of a plane 21F which forms the top of the trapezoidal cross section may be at most 0.2 mm. An angle α formed by a sidewall 21S of the protruding strip 21 with respect to a normal direction N of the sidewall portion 10 may be, for example, 35°. Further, a height h1 of the protruding strip 21 may be from 0.1 mm to less than 0.3 mm, for example, 0.2 mm from the viewpoint of inhibiting occurrence of a crack without deteriorating the visibility. Still further, an interval (pitch) P between protruding strips 21 which is measured in the vertical direction between adjacent protruding strips 21 is 0.8 mm or longer. Still further, also regarding the land portion 27 including the inside outer edge protruding portion 22 and the outside outer edge protruding portion 23, the cross-sectional shape of the sidewall 27S (22S, 23S) is a shape which is inclined with respect to the normal direction N of the sidewall portion 10. Still further, a height h2 of the land portion 27 may be 0.4 mm.

Second Embodiment

Figure 6A:
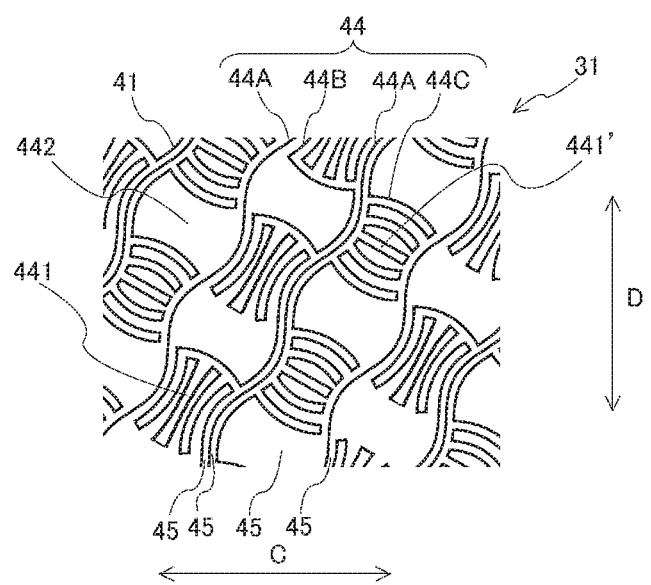
FIG. 6A is a partially enlarged view of a part taken out from a decorative band according to a second embodiment of the present invention.
Figure 6:
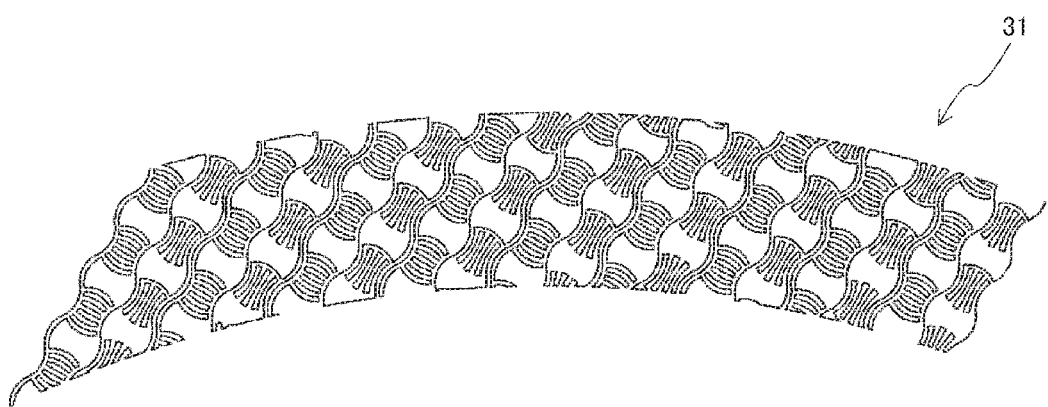
FIG. 6B is an explanatory drawing illustrating a whole pattern of the decorative band.

FIG. 6 A is a partially enlarged view of a part taken out from a decorative band according to a second embodiment of the present invention, and FIG. 6B is an explanatory drawing illustrating a whole pattern of the decorative band. The illustrated decorative band 31 is, similarly to the decorative band 11, formed of a protruding strip 41 continuously extending from an inside outer edge protruding portion to an outside outer edge protruding portion without interruption. Since the present embodiment is different from the first embodiment only in the pattern of a decorative element constituting a decorative band, the inside outer edge protruding portion and the outside outer edge protruding portion and the like are not illustrated.

The decorative band 31 is constituted by arranging in the tire circumferential direction a plurality of decorative elements 44, and the decorative elements 44 adjacent to each other in the tire circumferential direction are formed between the protruding strips 41 and are divided by a valley portion 45 extending in the tire radial direction. Also in this case, similarly to the case of the first embodiment, by providing the valley portion 45 between the plurality of arranged decorative elements 44 in the tire circumferential direction, an effect of inhibiting occurrence and development of a crack in the tire circumferential direction can be obtained.

As illustrated in FIG. 6B, similarly to the decorative band 11, the decorative band 31 as a whole substantially has a unicursal shape, and similarly to the decorative element 24, the decorative element 44 does not comprise an intersection at which the protruding strips 41 from three or more different directions are crossed, and in other words, the decorative element 44 has a unicursal shape from the inside to the outside in the tire radial direction. By this, molding man-hours can be reduced, and an effect of improving a moldability and cost performance can be obtained.

In the present embodiment, the decorative element 44 comprises a wave-shaped element 44A composed of the wave-shaped protruding strip 41 extending from the lower-left side of the paper to the upper-right side of the paper, or extending in a direction inclined with respect to the tire circumferential direction C from the inside to the outside in the tire radial direction viewed from the tire side surface, and zigzag-shaped elements 44B and 44C comprising a first region 441 in which the protruding strip 41 is densely arranged partially in a zigzag shape and a second region 442 in which the protruding strip 41 is loosely arranged. In the illustrated example, in the zigzag-shaped elements 44B and 44C, the first region 441 and the second region 442 are alternately provided, and as the whole decorative band 31, the first region 441 and the second region 442 are each set to be arranged in a zigzag shape by arranging each decorative element such that the first region 441 and the second region 442 are alternately arrayed both in one zigzag-shaped element and between zigzag-shaped elements adjacent to each other in the tire circumferential direction. The valley portion 45 is provided between decorative elements 44A, 44B, and 44C.

In the present embodiment, similarly to the first embodiment, the first region 441 and the second region 442 have the same contour shape when viewed from the tire outer surface side. For this reason, the uniformity of the whole decorative band 31 is improved. In the present embodiment, similarly to the first embodiment, the whole decorative band 31 includes first regions 441 and 441' in which extending directions of the protruding strips 41 are different, improving the visibility. Further, in the present embodiment, similarly to the first embodiment, in the decorative element 44, the first region 441 in which the protruding strip 31 is densely arranged partially in a zigzag shape is composed only of a portion in which the protruding strip 31 extends in a curved line, and does not substantially comprise a portion in which the protruding strip 31 extends in a straight line. Still further, in the present embodiment, similarly to the first embodiment, the decorative element 44 extends in a direction inclined with respect to the tire radial direction D.

Third Embodiment

Figure 7:
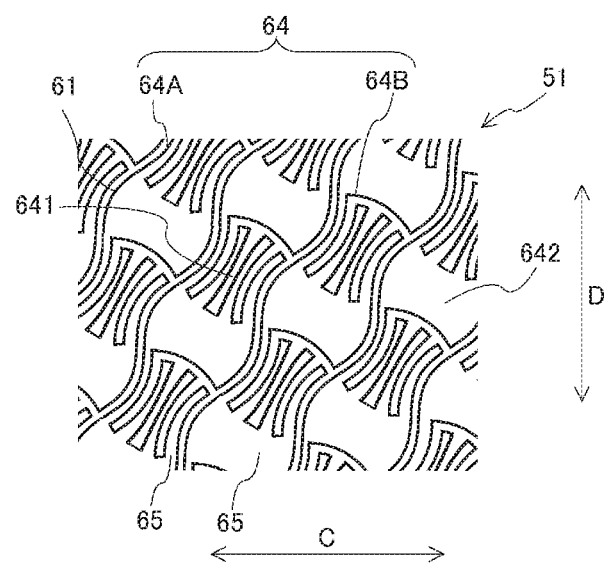
FIG. 7A is a partially enlarged view of a part taken out from a decorative band according to a third embodiment of the present invention.
FIG. 7B is a partially enlarged view of a part taken out from a decorative band according to a modified example of the third embodiment of the present invention.
Figure 7:
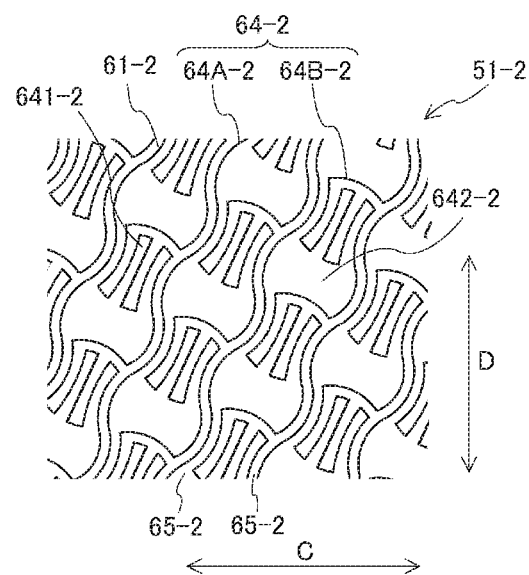

FIG. 7A is a partially enlarged view of a part taken out from a decorative band according to a third embodiment of the present invention, and FIG. 7B is a partially enlarged view of a part taken out from a decorative band according to a modified example of the third embodiment of the present invention. The pattern of a decorative band 51-2 in a modified example of the third embodiment of FIG. 7B is the same as the pattern of the decorative band 51 of the third embodiment illustrated in FIG. 7A except a portion of a first region 641-2 described below. The illustrated decorative band 51, 51-2 is, similarly to the decorative band 11, formed of a protruding strip 61, 61-2 continuously extending from an inside outer edge protruding portion to an outside outer edge protruding portion without interruption. Since the present embodiment is different from the first embodiment only in the pattern of a decorative element constituting a decorative band, the inside outer edge protruding portion and the outside outer edge protruding portion and the like are not illustrated.

The decorative band 51, 51-2 is constituted by arranging in the tire circumferential direction a plurality of decorative elements 64, 64-2, and the decorative elements 64, 64-2 adjacent to each other in the tire circumferential direction are formed between the protruding strips 61, 61-2 and are divided by a valley portion 65, 65-2 extending in the tire radial direction. Also in this case, similarly to the case of the first embodiment, by providing the valley portion 65, 65-2 between the plurality of arranged decorative elements 64, 64-2 in the tire circumferential direction, an effect of inhibiting occurrence and development of a crack in the tire circumferential direction can be obtained.

Similarly to the decorative band 11, the decorative band 51, 51-2 as a whole substantially has a unicursal shape, and similarly to the decorative element 24, the decorative element 64, 64-2 does not comprise an intersection at which the protruding strips 61, 61-2 from three or more different directions are crossed, and in other words, the decorative element 64, 64-2 has a unicursal shape from the inside to the outside in the tire radial direction. The shape of a whole unicursal pattern of the decorative band 51, 51-2 is substantially the same as the pattern of the decorative band 31 of the second embodiment illustrated in FIG. 6B except a portion of a first region 641, 641-2 described below. By this, molding man-hours can be reduced, and an effect of improving a moldability and cost performance can be obtained.

In the present embodiment, the decorative element 64, 64-2 comprises a wave-shaped element 64A, 64A-2 composed of the wave-shaped protruding strip 61, 61-2 extending from the lower-left side of the paper to the upper-right side of the paper, or extending in a direction inclined with respect to the tire circumferential direction C from the inside to the outside in the tire radial direction viewed from the tire side surface, and zigzag-shaped elements 64B, 64B-2 comprising a first region 641, 641-2 in which the protruding strip 61, 61-2 is densely arranged partially in a zigzag shape and a second region 642, 642-2 in which the protruding strip 61, 61-2 is loosely arranged. In the illustrated example, in the zigzag-shaped elements 64B, 64B-2, the first region 641, 641-2 and the second region 642, 642-2 are alternately provided, and as the whole decorative band 51, 51-2, the first region 641, 641-2 and the second region 642, 642-2 are each set to be arranged in a zigzag shape by arranging each decorative element such that the first region 641, 641-2 and the second region 642, 642-2 are alternately arrayed both in one zigzag-shaped element and between zigzag-shaped elements adjacent to each other in the tire circumferential direction. The valley portion 65 and the valley portion 65-2 are provided between decorative elements 64A, 64B and between decorative elements 64A-2, 64B-2.

In the present embodiment, similarly to the first and the second embodiments, the first region 641, 641-2 and the second region 642, 642-2 have the same contour shape when viewed from the tire outer surface side. For this reason, the uniformity of the whole decorative band 51, 51-2 is improved. In the present embodiment, similarly to the first and the second embodiments, in the decorative element 64, 64-2, the first region 641, 641-2 in which the protruding strip 51, 51-2 is densely arranged partially in a zigzag shape is composed only of a portion in which the protruding strip 51, 51-2 extends in a curved line, and does not substantially comprise a portion in which the protruding strip 51, 51-2 extends in a straight line. Still further, in the present embodiment, similarly to the first and the second embodiments, the decorative element 64, 64-2 extends in a direction inclined with respect to the tire radial direction D.

On the other hand, in the present embodiment, different form the first and the second embodiments, all extending directions of the protruding strip 61, 61-2 in the first region 641, 641-2 included in the whole decorative band 51, 51-2 are the same.

Fourth Embodiment

Figure 8:
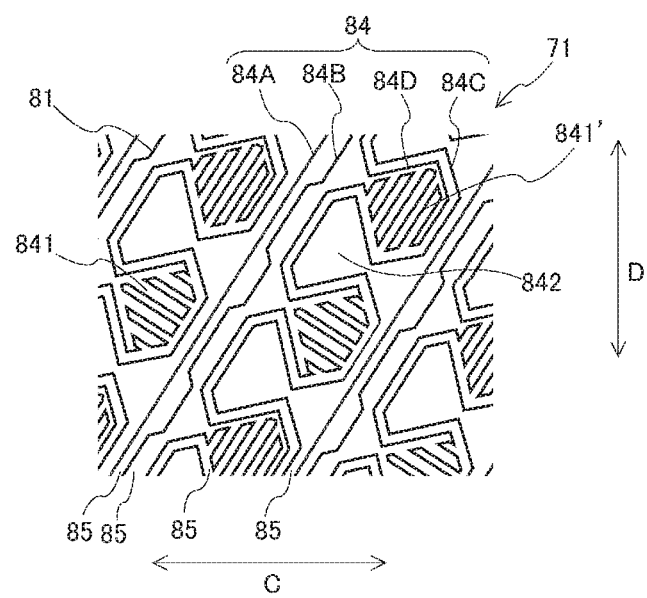
FIG. 8A is a partially enlarged view of a part taken out from a decorative band according to a fourth embodiment of the present invention.
FIG. 8B is an explanatory drawing illustrating a whole pattern of the decorative band.
Figure 8:
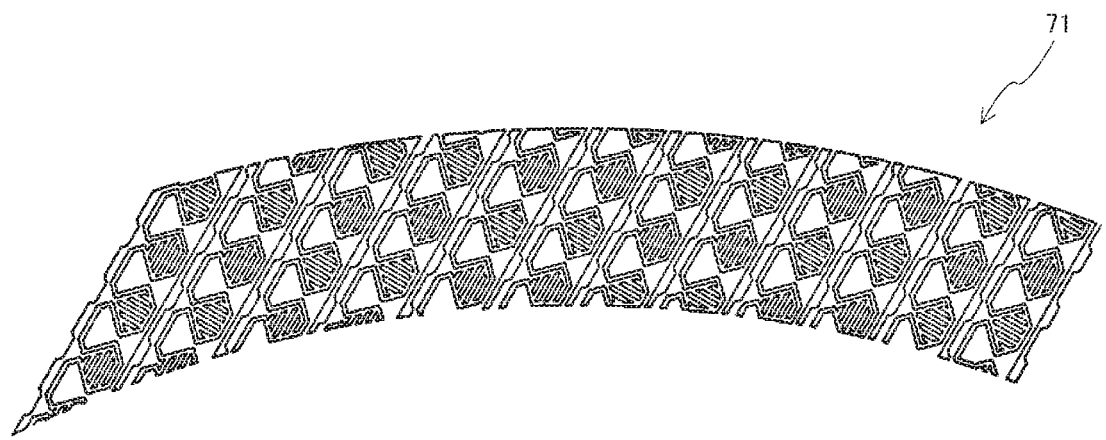

FIG. 8A is a partially enlarged view of a part taken out from a decorative band according to a fourth embodiment of the present invention, and FIG. 8B is an explanatory drawing illustrating a whole pattern of the decorative band. The illustrated decorative band 71 is, similarly to the decorative band 11, formed of a protruding strip 81 continuously extending from an inside outer edge protruding portion to an outside outer edge protruding portion without interruption. Since the present embodiment is different from the first embodiment only in the pattern of a decorative element constituting a decorative band, the inside outer edge protruding portion and the outside outer edge protruding portion and the like are not illustrated.

The decorative band 71 is constituted by arranging in the tire circumferential direction a plurality of decorative elements 84, and the decorative elements 84 adjacent to each other in the tire circumferential direction are formed between the protruding strips 81 and are divided by a valley portion 85 extending in the tire radial direction. Also in this case, similarly to the case of the first embodiment, by providing the valley portion 85 between the plurality of arranged decorative elements 84 in the tire circumferential direction, an effect of inhibiting occurrence and development of a crack in the tire circumferential direction can be obtained.

As illustrated in FIG. 8B, similarly to the decorative band 11, the decorative band 71 as a whole substantially has a unicursal shape, and similarly to the decorative element 24, the decorative element 84 does not comprise an intersection at which the protruding strips 81 from three or more different directions are crossed, and in other words, the decorative element 84 has a unicursal shape from the inside to the outside in the tire radial direction. By this, molding man-hours can be reduced, and an effect of improving a moldability and cost performance can be obtained.

In the present embodiment, the decorative element 84 comprises a straight line-shaped element 84A composed of the straight line-shaped protruding strip 81 extending from the lower-left side of the paper to the upper-right side of the paper, or extending in a direction inclined with respect to the tire circumferential direction C from the inside to the outside in the tire radial direction viewed from the tire side surface, bent-shaped elements 84B and 84C formed of the protruding strip 81 including a bent portion, and zigzag-shaped elements 84D comprising a first region 841 in which the protruding strip 81 is densely arranged partially in a zigzag shape and a second region 842 in which the protruding strip 81 is loosely arranged. In the illustrated example, in the zigzag-shaped elements 84D, the first region 841 and the second region 842 are alternately provided, and as the whole decorative band 71, the first region 841 and the second region 842 are each set to be arranged in a zigzag shape by arranging each decorative element such that the first region 841 and the second region 842 are alternately arrayed both in one zigzag-shaped element and between zigzag-shaped elements adjacent to each other in the tire circumferential direction. The valley portion 85 is provided between decorative elements 84A, 84B, 84C and 84D.

In the present embodiment, similarly to the first to the third embodiments, the first region 841 and the second region 842 have the same contour shape when viewed from the tire outer surface side. For this reason, the uniformity of the whole decorative band 71 is improved. In the present embodiment, similarly to the first and the second embodiments, the whole decorative band 71 includes first regions 841 and 841' in which extending directions of the protruding strips 81 are different, improving the visibility. Further, in the present embodiment, similarly to the first to the third embodiments, the decorative element 84 extends in a direction inclined with respect to the tire radial direction.

On the other hand, in the present embodiment, different form the first to the third embodiments, in the decorative element 84, the first region 841 in which the protruding strip 71 is densely arranged partially in a zigzag shape is composed only of a portion in which the protruding strip 71 extends in a straight line.

Fifth Embodiment

Figure 9:
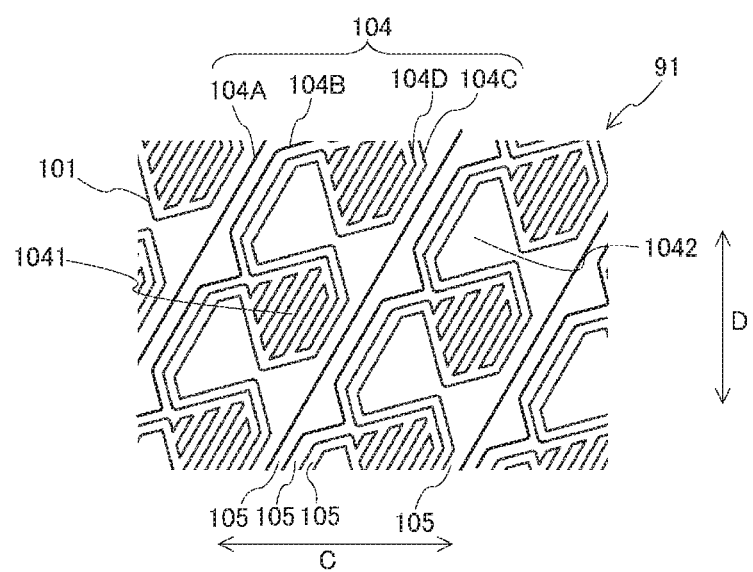
FIG. 9 is a partially enlarged view of a part taken out from a decorative band according to a fifth embodiment of the present invention.

FIG. 9 is a partially enlarged view of a part taken out from a decorative band according to a fifth embodiment of the present invention. The illustrated decorative band 91 is, similarly to the decorative band 11, formed of a protruding strip 101 continuously extending from an inside outer edge protruding portion to an outside outer edge protruding portion without interruption. Since the present embodiment is different from the first embodiment only in the pattern of a decorative element constituting a decorative band, the inside outer edge protruding portion and the outside outer edge protruding portion and the like are not illustrated.

The decorative band 91 is constituted by arranging in the tire circumferential direction a plurality of decorative elements 104, and the decorative elements 104 adjacent to each other in the tire circumferential direction are formed between the protruding strips 101 and are divided by a valley portion 105 extending in the tire radial direction. Also in this case, similarly to the case of the first embodiment, by providing the valley portion 105 between the plurality of arranged decorative elements 104 in the tire circumferential direction, an effect of inhibiting occurrence and development of a crack in the tire circumferential direction can be obtained.

Similarly to the decorative band 11, the decorative band 91 as a whole substantially has a unicursal shape, and similarly to the decorative element 24, the decorative element 104 does not comprise an intersection at which the protruding strips 101 from three or more different directions are crossed, and in other words, the decorative element 104 has a unicursal shape from the inside to the outside in the tire radial direction. The shape of a whole unicursal pattern of the decorative band 91 is substantially the same as the pattern of the decorative band 71 of the fourth embodiment illustrated in FIG. 8B except a portion of a first region 1041 described below. By this, molding man-hours can be reduced, and an effect of improving a moldability and cost performance can be obtained.

In the present embodiment, the decorative element 104 comprises a straight line-shaped element 104A composed of the straight line-shaped protruding strip 101 extending from the lower-left side of the paper to the upper-right side of the paper, or extending in a direction inclined with respect to the tire circumferential direction C from the inside to the outside in the tire radial direction viewed from the tire side surface, bent-shaped elements 104B and 104C formed of the protruding strip 101 including a bent portion, and zigzag-shaped elements 104D comprising a first region 1041 in which the protruding strip 101 is densely arranged partially in a zigzag shape and a second region 1042 in which the protruding strip 101 is loosely arranged. In the illustrated example, in the zigzag-shaped elements 104D, the first region 1041 and the second region 1042 are alternately provided, and as the whole decorative band 91, the first region 1041 and the second region 1042 are each set to be arranged in a zigzag shape by arranging each decorative element such that the first region 1041 and the second region 1042 are alternately arrayed both in one zigzag-shaped element and between zigzag-shaped elements adjacent to each other in the tire circumferential direction. The valley portion 105 is provided between decorative elements 104A, 104B, 104C and 104D.

In the present embodiment, similarly to the first to the fourth embodiments, the first region 1041 and the second region 1042 have the same contour shape when viewed from the tire outer surface side. For this reason, the uniformity of the whole decorative band 91 is improved. Further, in the present embodiment, similarly to the first to the fourth embodiments, the decorative element 104 extends in a direction inclined with respect to the tire radial direction.

On the other hand, in the present embodiment, different from the first, the second, and fourth embodiment, all extending directions of the protruding strip 101 in the first region 1041 included in the whole decorative band 91 are the same. In the present embodiment, different from the first to third embodiments, in the decorative element 104, the first region 1041 in which the protruding strip 91 is densely arranged partially in a zigzag shape is composed only of a portion in which the protruding strip 91 extends in a straight line.

As described above, the tire of the present invention comprises a decorative portion including a decorative band having high designability and excellent visibility. Since a decorative portion including such a decorative band has an effect of improving visibility, it is generally arranged on a sidewall portion on the side facing the outside of a vehicle when the tire is mounted on the vehicle. Accordingly, it is preferable that, in the case of a tire comprising a asymmetrical tread pattern, a decorative portion including a decorative band according to the present invention is arranged only on a sidewall portion on the side facing the outside of a vehicle when the tire is mounted on the vehicle, and on the other hand, in the case of a tire comprising a directional tread pattern, it is arranged on sidewall portions on both left and right sides.

DESCRIPTION OF SYMBOLS 10 sidewall portion
11 decorative band (decorative portion)
12 second decorative band (decorative portion)
13 mark portion (decorative portion)
21, 41, 61, 61-2, 81, 101 protruding strip
21F plane
22 inside outer edge protruding portion
22S, 23S, 26S, 27S sidewall
23 outside outer edge protruding portion
24, 44, 64, 64-2, 84, 104 decorative element
24A, 44A, 64A, 64A-2 wave-shaped element
24B, 24C, 44B, 44C, 64B, 64B-2, 84D, 104D zigzag-shaped element
241, 241', 441, 441', 641, 641-2, 841, 841', 1041 first region
242, 442, 642, 642-2, 842, 1042 second region
25, 45, 65, 65-2, 85, 105 valley portion
26 two-sided outer edge protruding portion
27 land portion
31, 51, 51-2, 71, 91 decorative band
84A, 104A straight line-shaped element
84B, 84C, 104B, 104C bent-shaped element

The invention claimed is:

1. A tire comprising:
a decorative band, on a sidewall portion of the tire, formed of protruding strips;
an inside outer edge protruding portion on the sidewall portion of the tire; and
an outside outer edge protruding portion on the sidewall portion of the tire, wherein
the inside outer edge protruding portion and the outside outer edge protruding portion are arranged adjacent the decorative band, inside and outside the decorative band in a tire radial direction respectively, and are more protruded toward the tire outer surface side than the protruding strips,
each of the protruding strips of the decorative band forms decorative elements, including a first decorative element, each of the protruding strips continuously extending from the inside outer edge protruding portion to the outside outer edge protruding portion without interruption in a tire circumferential direction,
the protruding strips include a first protruding strip and a second protruding strip that are adjacent to each other in the tire circumferential direction,
the decorative elements of the first protruding strip are separated from the decorative elements of the second protruding strip by a valley portion which is formed between the first protruding strip and the second protruding strip, the valley portion extending in the tire radial direction, and
for each first decorative element of each protruding strip of the protruding strips:
at least a portion of the first decorative element comprises at least one first region in which the protruding strip is densely arranged partially in a zigzag shape and at least one second region in which the protruding strip is loosely arranged,
the first decorative element does not comprise an intersection at which the protruding strips from three or more different directions are crossed, and
the at least one first region and the at least one second region have the same contour shape, when viewed from the tire outer surface side.

2. The tire according to claim 1, wherein
in one of the at least one first region of the first protruding strip, the first protruding strip has a different extending direction than an extending direction of the first protruding strip another of the at least one first region of the first protruding strip, or the first protruding strip has a different extending direction than an extending direction of the second protruding strip in a first region of the at least one first region of the second protruding strip.

3. The tire according to claim 2, wherein
in the one of the at least one first region of the first protruding strip, the first protruding strip has the different extending direction than the extending direction of the first protruding strip in the another of the at least one first region of the first protruding strip, and the one and the another of the at least one first region of the first protruding strip are adjacent in the tire radial direction, or
in the one of the at least one first region of the first protruding strip, the first protruding strip has the different extending direction than the extending direction of the second protruding strip in the first region of the at least one first region of the second protruding strip, and the one of the at least one first region of the first protruding strip and the first region of the at least one first region of the second protruding strip are adjacent in the tire circumferential direction.

4. The tire according to claim 1, wherein each first decorative element, of each protruding strip of the protruding strips, extends in a direction inclined with respect to the tire radial direction.

5. The tire according to claim 1, further comprising:
a first outer edge protruding portion and a second outer edge protruding portion that are on respective sides of the decorative band in the tire circumferential direction and that extend in the tire radial direction, wherein
the first outer edge protruding portion and the second outer edge protruding portion has a same height as the inside outer edge protruding portion and the outside outer edge protruding portion.

6. The tire according to claim 1, wherein
each first decorative element of each of the protruding strips comprises a plurality of first regions as the at least one first region and a plurality of second regions as the at least one second region, arranged in the tire radial direction, and
each first region in the plurality of first regions and each second region in the plurality of second regions has a width in the tire circumferential direction that is not larger than 20 mm.

7. The tire according to claim 1, wherein
each of the protruding strips forms a respective unicursal shape that continuously extends from the inside outer edge protruding portion to the outside outer edge protruding portion without interruption in the tire circumferential direction.

8. The tire according to claim 7, wherein
the protruding strips, together, form a unicursal shape that includes each of the respective unicursal shapes of each of the protruding strips.

* * * * *